US011719979B2

(12) United States Patent
Du et al.

(10) Patent No.: US 11,719,979 B2
(45) **Date of Patent: *Aug. 8, 2023**

(54) ARRAY SUBSTRATE, DIMMING LIQUID CRYSTAL PANEL, AND DISPLAY PANEL

(71) Applicants: HEFEI BOE DISPLAY TECHNOLOGY CO., LTD., Anhui (CN); BOE TECHNOLOGY GROUP CO., LTD., Beijing (CN)

(72) Inventors: Yue Du, Beijing (CN); Wei Guo, Beijing (CN); Ke Dai, Beijing (CN); Lei Guo, Beijing (CN); Liangliang Jiang, Beijing (CN); Jiaqing Liu, Beijing (CN); Yuanhui Guo, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 358 days.

This patent is subject to a terminal disclaimer.

(21) Appl. No.: 16/977,938

(22) PCT Filed: Nov. 28, 2019

(86) PCT No.: PCT/CN2019/121657

§ 371 (c)(1),
(2) Date: Sep. 3, 2020

(87) PCT Pub. No.: WO2021/102816

PCT Pub. Date: Jun. 3, 2021

(65) Prior Publication Data

US 2022/0326582 A1 Oct. 13, 2022

(51) Int. Cl.
*G02F 1/1337* (2006.01)
*G02F 1/1362* (2006.01)
(Continued)

(52) U.S. Cl.
CPC ...... *G02F 1/133707* (2013.01); *G02F 1/1368* (2013.01); *G02F 1/134336* (2013.01); *G02F 1/136286* (2013.01)

(58) Field of Classification Search
CPC ......... G02F 1/133707; G02F 1/134336; G02F 1/136286
See application file for complete search history.

(56) References Cited

U.S. PATENT DOCUMENTS

2008/0043191 A1 2/2008 Kim et al.
2009/0219477 A1 9/2009 Kim et al.
(Continued)

FOREIGN PATENT DOCUMENTS

CN 103140797 A 6/2013
CN 103268044 A 8/2013
(Continued)

OTHER PUBLICATIONS

Chinese Office Action dated May 30, 2022 relating to CN Patent Application No. 201980002637.5.

*Primary Examiner* — Dung T Nguyen
(74) *Attorney, Agent, or Firm* — Dinsmore & Shohl LLP

(57) ABSTRACT

The present disclosure provides an array substrate, a dimming liquid crystal panel and a display panel. The array substrate includes: a first transparent electrode layer with a plurality of slit structures, wherein the first transparent electrode layer comprises a plurality of domains, the plurality of domains comprise at least two types of domains, each of the plurality of domains is adjacent to different types of domains along both a row direction and a column direction; and a plurality of gate lines extending along the row direction and a plurality of data lines extending along the column direction, the plurality of gate lines and the plurality of data lines crossing to define a plurality of dimming regions arranged in an array.

18 Claims, 5 Drawing Sheets

Backlight

(51) Int. Cl.

| | |
|---|---|
| ***G02F 1/1368*** | (2006.01) |
| ***G02F 1/1343*** | (2006.01) |

(56) References Cited

U.S. PATENT DOCUMENTS

| | | | |
|---|---|---|---|
| 2013/0183612 | A1 | 7/2013 | Sawayama et al. |
| 2014/0098308 | A1 | 4/2014 | Wu et al. |
| 2018/0292717 | A1 | 10/2018 | Zeng et al. |
| 2018/0348571 | A1 | 12/2018 | Yoon et al. |
| 2019/0285951 | A1 | 9/2019 | Miyachi et al. |
| 2020/0243025 | A1 | 7/2020 | Xi et al. |
| 2020/0292894 | A1 | 9/2020 | Liu et al. |
| 2022/0137470 | A1* | 5/2022 | Du ........................ G02F 1/1368 349/33 |

FOREIGN PATENT DOCUMENTS

| | | | |
|---|---|---|---|
| CN | 103513472 | A | 1/2014 |
| CN | 105319763 | A | 2/2016 |
| CN | 106483727 | A | 3/2017 |
| CN | 106847836 | A | 6/2017 |
| CN | 107154409 | A | 9/2017 |
| CN | 108510947 | A | 9/2018 |
| CN | 108983463 | A | 12/2018 |
| CN | 208922014 | U | 5/2019 |
| CN | 110023827 | A | 7/2019 |
| CN | 110361899 | * | 10/2019 |

* cited by examiner

ARRAY SUBSTRATE, DIMMING LIQUID CRYSTAL PANEL, AND DISPLAY PANEL

CROSS-REFERENCE TO RELATED APPLICATIONS

The present disclosure is a U.S. National Stage Application under 35 U.S.C. § 371 of International Patent Application No. PCT/CN2019/121657, filed on Nov. 28, 2019, the disclosure of which is hereby incorporated into this disclosure by reference in its entirety.

TECHNICAL FIELD

The present disclosure relates to the technical field of display, and particularly to an array substrate, a dimming liquid crystal panel, and a display panel.

BACKGROUND

Among flat panel display devices, the liquid crystal display device dominates the product markets due to its characteristics such as small volume, low power consumption, relatively low manufacturing cost, and no radiation. How to improve the display quality of the liquid crystal display device and bring better viewing experiences to users is always an important research direction for those skilled in the art.

SUMMARY

According to a first aspect of the embodiments of the present disclosure, there is provided an array substrate comprising:

a first transparent electrode layer with a plurality of slit structures, wherein the first transparent electrode layer comprises a plurality of domains, the plurality of domains comprise at least two types of domains, each of the plurality of domains is adjacent to different types of domains along both a row direction and a column direction, slit structures located in a same type of domain extend in a same direction, and slit structures located in different types of domains extend in different directions; and a plurality of gate lines extending along the row direction and a plurality of data lines extending along the column direction, the plurality of gate lines and the plurality of data lines crossing to define a plurality of dimming regions arranged in an array, wherein each of the plurality of dimming regions is overlapped with the at least two types of domains in the first transparent electrode layer.

In some embodiments, a ratio of an area of one of the plurality of domains to an area of one of the plurality of dimming regions is equal to or greater than $1/16$ and equal to or less than $1/2$.

In some embodiments, the plurality of gate lines extend in a fold-line waveform along the row direction, and comprises a plurality of first fold line units arranged periodically, wherein each of the plurality of first fold line units comprises two first straight line segments symmetrically arranged with the column direction as a symmetry axis; and the plurality of data line extends in a fold-line waveform along the column direction and comprises a plurality of second fold line units arranged periodically, wherein each of the plurality of second fold line units comprises a first subsegment and a second subsegment which are centrosymmetric, and the first subsegment and the second subsegment each comprise two second straight line segments symmetrically arranged with the row direction as a symmetric axis;

the array substrate further comprises: a common electrode line located between adjacent two of the plurality of data lines, wherein the common electrode line extends in a fold-line waveform along the column direction and comprises a plurality of third fold line units arranged periodically, each of the plurality of third fold line units comprises a third subsegment and a fourth subsegment which are centrosymmetric, and the third subsegment and the fourth subsegment each comprise two third straight line segments symmetrically arranged with the row direction as a symmetric axis.

In some embodiments, shapes of the common electrode line and one of the plurality of data lines are substantially symmetrical with respect to the column direction, or the shapes of the common electrode line and one of the plurality of data lines are substantially the same.

In some embodiments, in a direction perpendicular to the array substrate, an end point of each of the plurality of first fold line units coincides with an endpoint or a midpoint of one of the plurality of second fold line units, and a midpoint of each of the plurality of first fold line units coincides with an end point or a midpoint of one of the plurality of third fold line units.

In some embodiments, in the direction perpendicular to the array substrate, second straight line segments and third straight line segments located in the same type of domain extend in the same direction as the slit structures extend.

In some embodiments, an acute angle formed by one of the plurality of slits and the column direction is in a range greater than or equal to 7 degrees, and less than or equal to 11 degrees.

In some embodiments, the plurality of domains are rectangular in shape and same in size, and the plurality of domains comprises two types of domains arranged in a mosaic shape.

In some embodiments, in a direction perpendicular to the array substrate, each of the first straight line segments substantially coincides with one of diagonal lines of 2×2 of domains; and an orthographic projection of one of the plurality of second fold line units and one of the plurality of third fold line units in the column direction is substantially equal to four times a length of a long side of one of the plurality of domains.

In some embodiments, the shape of each of the plurality of domains comprises triangle, rectangle, diamond, trapezoid, or polygon with a number of sides greater than four.

In some embodiments, the plurality of domains comprise two types of domains, one type of domains comprises a trapezoidal first domain and a triangular second domain, and the other type of domains comprises a trapezoidal third domain and a triangular fourth domain, wherein: the trapezoidal first domain and the triangular fourth domain are adjacent in the column direction and are spliced into a first isosceles triangle, and in the direction perpendicular to the array substrate, two sides of the first isosceles triangle substantially coincide with one of the plurality of first fold line units; and the triangular second domain and the trapezoidal third domain are adjacent in the column direction and are spliced into a second isosceles triangle, and in the direction perpendicular to the array substrate, two sides of the second isosceles triangle substantially coincide with one of the plurality of first fold line units.

In some embodiments, an area ratio of the trapezoidal first domain to the triangular fourth domain is 3:1, and an area ratio of the trapezoidal third domain to the triangular second domain is 3:1; and an orthographic projection of one of the plurality of second fold line units and one of the plurality of third fold line units in the column direction is substantially equal to four times a height of the trapezoidal first domain.

In some embodiments, the array substrate further comprises: thin film transistors disposed at crossings of the gate lines and the data lines and respectively connected to the gate lines and the data lines, wherein: the thin film transistors arranged along the row direction are arranged on a same side of the data lines adjacent to the thin film transistors; and the thin film transistors arranged along the column direction are alternately arranged on both sides of each of the data lines adjacent to the thin film transistors.

In some embodiments, the array substrate further comprises: a second transparent electrode layer insulated and spaced apart from the first transparent electrode layer, wherein the second transparent electrode layer is configured to form a fringe electric field with the first transparent electrode layer to control deflection of liquid crystal molecules.

According to another aspect of the embodiments of the present disclosure, there is provided a dimming liquid crystal panel comprising: an array substrate according to any of the above technical solutions, an opposite substrate spaced apart from the array substrate, and a liquid crystal layer located between the array substrate and the opposite substrate.

According to still another aspect of the embodiments of the present disclosure, a display panel is provided, comprising the dimming liquid crystal panel according to the above technical solution, and a display liquid crystal panel located on a light emission side of the dimming liquid crystal panel.

BRIEF DESCRIPTION OF THE DRAWINGS

The accompanying drawings, which constitute a part of the specification, illustrate the embodiments of the present disclosure and, together with the description, serve to explain the principles of the present disclosure.

The present disclosure will be understood more clearly according to the following detailed description with reference to the accompanying drawings.

Please be appreciated that, the sizes of various portions shown in the accompanying drawings are not drawn to actual scale. Furthermore, identical or similar reference numerals are used to refer to identical or similar members.

DETAILED DESCRIPTION

Figure 1A:
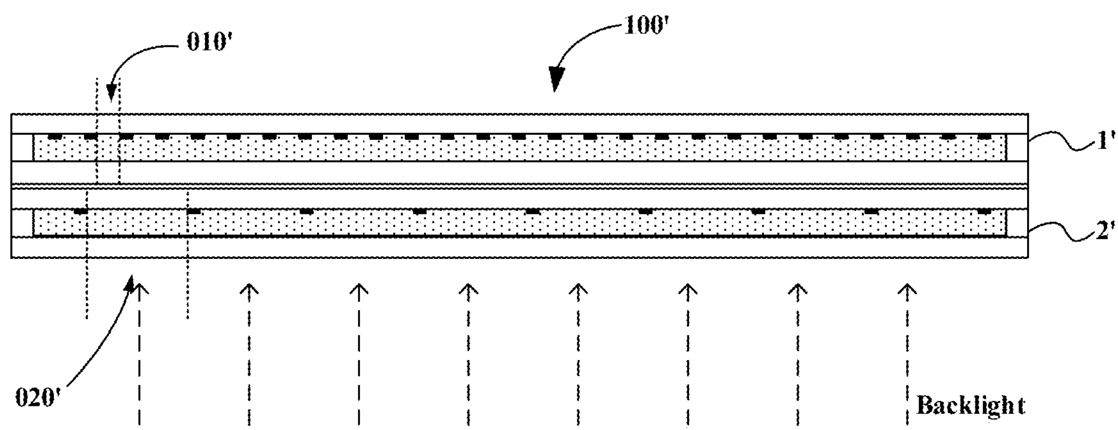
FIG. 1*a* is a cross-sectional schematic view of a display panel in the related art.

Various exemplary embodiments of the present disclosure will be described in detail with reference to the accompanying drawings in the following. The following description of the exemplary embodiments is merely illustrative in nature and is in no way intended to limit this disclosure, its application, or uses. The present disclosure may be implemented in many different forms and is not limited to the embodiments described herein. These embodiments are provided merely for making the present disclosure thorough and complete, and sufficiently expressing the scope of the present disclosure to one of ordinary skill in the art. It should be noted that the relative arrangement of the components and steps, compositions of materials, the numerical expressions, and numerical values set forth in these embodiments are interpreted to be merely illustrative instead of restrictive, unless it is specifically stated otherwise.

The words "first", "second" and the like used in the present disclosure do not imply any sequence, number or importance, but are merely used to distinguishing different portions. The word "comprise" or "include" or the like means that an element preceding the word covers elements listed following the word, but does not preclude the possibility of covering also other elements. The terms "up", "down", "left", "right" and the like are merely used for implying relative position relations, and after an absolute position of the object described changes, the relative position relation may possibly change correspondingly.

In this disclosure, when a specific device is described between a first device and a second device, an intermediate device may exist between the specific device and the first device or the second device, or an intermediate device may not exist. When a specific device is described to be connected to another device, the specific device may be directly connected with the another device without an intermediate device, or it may not be directly connected with the another device but has an intermediate device.

All terms (including technical or scientific terms) used in this disclosure have the same meanings as understood by one of ordinary skill in the art, unless otherwise specifically defined. It should also be understood that the terms defined in common dictionaries should be interpreted as having meanings consistent with their meanings in the context of the relevant technologies, but should not be interpreted with idealized or extremely formalized meanings, unless otherwise expressly defined herein.

Techniques, methods and apparatus as known by one of ordinary skill in the relevant art may not be discussed in detail, but are intended to be regarded as a part of the specification where appropriate.

At present, a common type of display device in the market is the liquid crystal display device. A conventional liquid crystal display device generally comprises a liquid crystal display panel and a backlight module disposed at a light incidence side of the liquid crystal display panel. The liquid crystal display panel comprises: an array substrate and a filtering substrate which are oppositely arranged to form a liquid crystal cell, liquid crystal located between the array substrate and the filtering substrate, a first polarizer located on one side of the array substrate away from the filtering substrate, and a second polarizer located on one side of the filtering substrate away from the array substrate, wherein the array substrate is closer to the backlight module than the filtering substrate, and polarization directions of the first polarizer and the second polarizer are orthogonal. The liquid crystal display panel comprises a plurality of pixel units, each including a plurality of sub-pixels having different colors. The sub-pixels of the same pixel unit mix light according to a certain proportion, so that the pixel unit can display colors visible to human eyes. Such a conventional liquid crystal display device has technical defects of poor picture contrast and light leakage in dark state due to its own structural characteristics.

In order to improve the above defects, the related art proposes a liquid crystal display device using a dual-screen driving technique. It differs from the conventional liquid crystal display device mainly in that, as shown in FIG. 1*a*, a display panel 100' comprises a dimming liquid crystal panel 2' and a display liquid crystal panel 1' which are stacked. The display liquid crystal panel 1' has a structure and an operating principle similar to those of the above-mentioned liquid crystal display panel, and the dimming liquid crystal panel 2' is located on a light incidence side of the display liquid crystal panel 1' and a light emission side of the backlight module (the backlight module is not shown in FIG. 1*a*, and the light emission of the backlight module is shown by dotted arrows in FIG. 1*a*), and comprises a plurality of dimming pixels 020' arranged in an array. Each dimming pixel 020' serves as a dimming unit, and is located opposite to a plurality of sub-pixels 010' of the display liquid crystal panel 1', for controlling the direction and intensity of the backlight incident into a respective region of the display liquid crystal panel 1' through the dimming pixel 020'.

The liquid crystal display device in the related art can realize finer regional dimming on a picture according to the following principle: light transmittance (i.e., the direction and/or intensity to of the backlight allowed to transmit through) of a respective dimming pixel 020' of the dimming liquid crystal panel 2' is adjusted according to a gray scale of a displayed picture in a different region. For example, for a region with a higher picture brightness, the light transmittance of the respective dimming pixel 020' of the dimming liquid crystal panel 2' is adjusted to be relatively higher; for a region with a lower picture brightness, the light transmittance of the respective dimming pixel 020' of the dimming liquid crystal panel 2' is adjusted to be relatively lower; for a region where the picture is displayed as black, the light transmittance of the respective dimming pixel 020' of the dimming liquid crystal panel 2' is adjusted to be substantially zero. Compared with the conventional liquid crystal display device, this liquid crystal display device can overcome the defect of light leakage in dark state of the picture, and remarkably improve the contrast, thereby bringing a better viewing experience to the user. Particularly, when the liquid crystal display device performs HDR (High-Dynamic Range) display, the regional dimming makes the brightness range of the picture wider, the low gray scale transition more natural, and the display effect better.

Figure 1B:
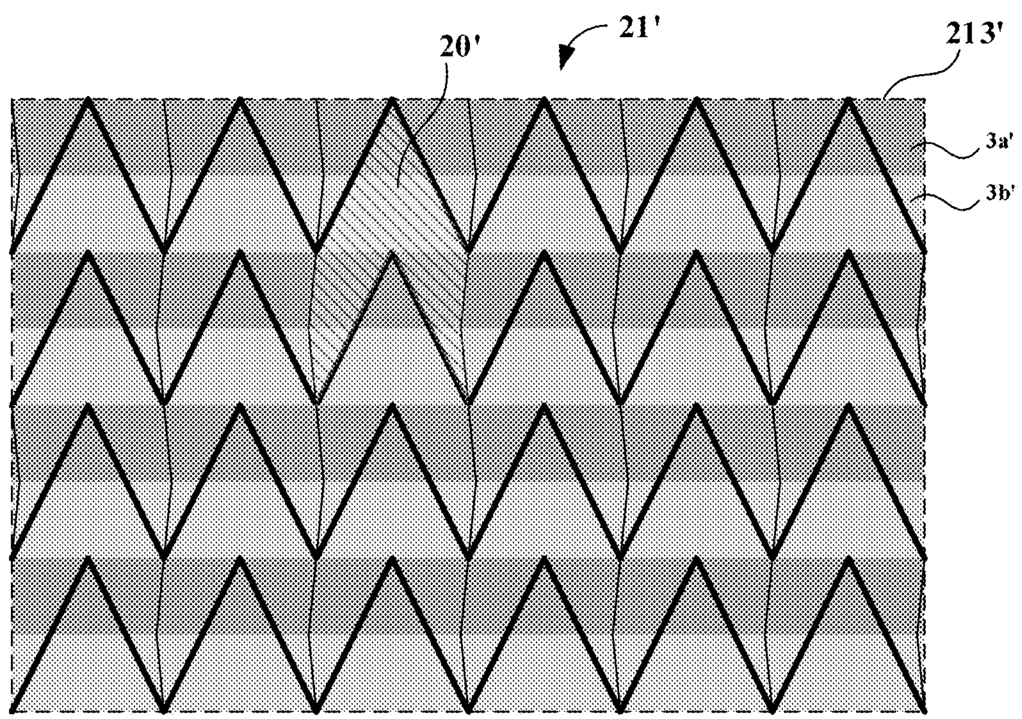
FIG. 1*b* is a front view of an array substrate of a dimming liquid crystal panel in the related art.

As shown in FIG. 1*b*, in a array substrate 21' of the dimming liquid crystal display panel, a common electrode layer 213' having a plurality of slit structures (the slit structures are not shown in the figure) comprises two types of domains 3*a*' and 3*b*' alternately arranged along the column direction, and the array substrate 21' corresponding to each dimming region 20' of the dimming pixel 020' overlaps with the two types of domains 3*a*' and 3*b*'. Thus, the liquid crystal molecules of the dimming pixel 020' can exhibit two axi-symmetric orientations under the driving of the electric field formed by the common electrode layer and the pixel electrode layer (not shown in the figure), so that a viewing angle of the display panel in the horizontal direction exhibits axial symmetry.

In order to increase the transmittance of the display panel and reduce the capacitive load of the dimming liquid crystal display panel, the dimming liquid crystal display panel is usually designed to be low in resolution. When the display panel is designed to be large in size, for example, 65 inches or more, each dimming pixel is also large in size. When people look at the picture from a side view, since a direction of the electric field formed by the common electrode layer and the pixel electrode layer of the same dimming pixel in a different domain is different, deflection directions of the liquid crystal are also different, and refraction effects to light are also different. When looking at the picture from the side view, there is a certain difference between the transmittances of the two types of the domains, such that human eyes can see obvious stripes, and especially when the picture is displayed as white, the stripes are alternate in yellow and blue, resulting in a very unsatisfactory viewing experience.

To solve the technical problems in the related art, the embodiments of the present disclosure provide an array substrate, a dimming liquid crystal panel and a display panel.

In the embodiments of the present disclosure, the dimming pixel is directed to the dimming liquid crystal panel, and its overall structure is designed to control the direction and intensity of the backlight incident into a respective region of the display liquid crystal panel through the dimming pixel. The dimming region is directed to the array substrate, is defined by the crossing of gate lines and data lines adjacent to the gate lines, and has a one-to-one correspondence with the dimming pixel, and the structural design of the array substrate in the dimming region is a part of the structural design of the dimming pixel.

Figure 2A:
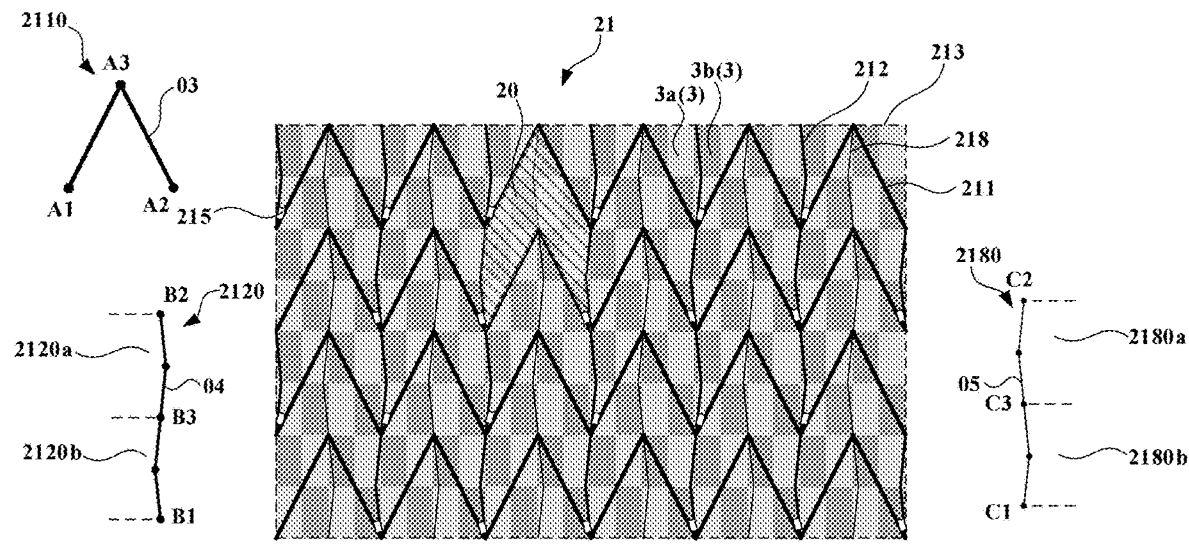
FIG. 2*a* is a front view of an array substrate according to an embodiment of the present disclosure.
Figure 3:
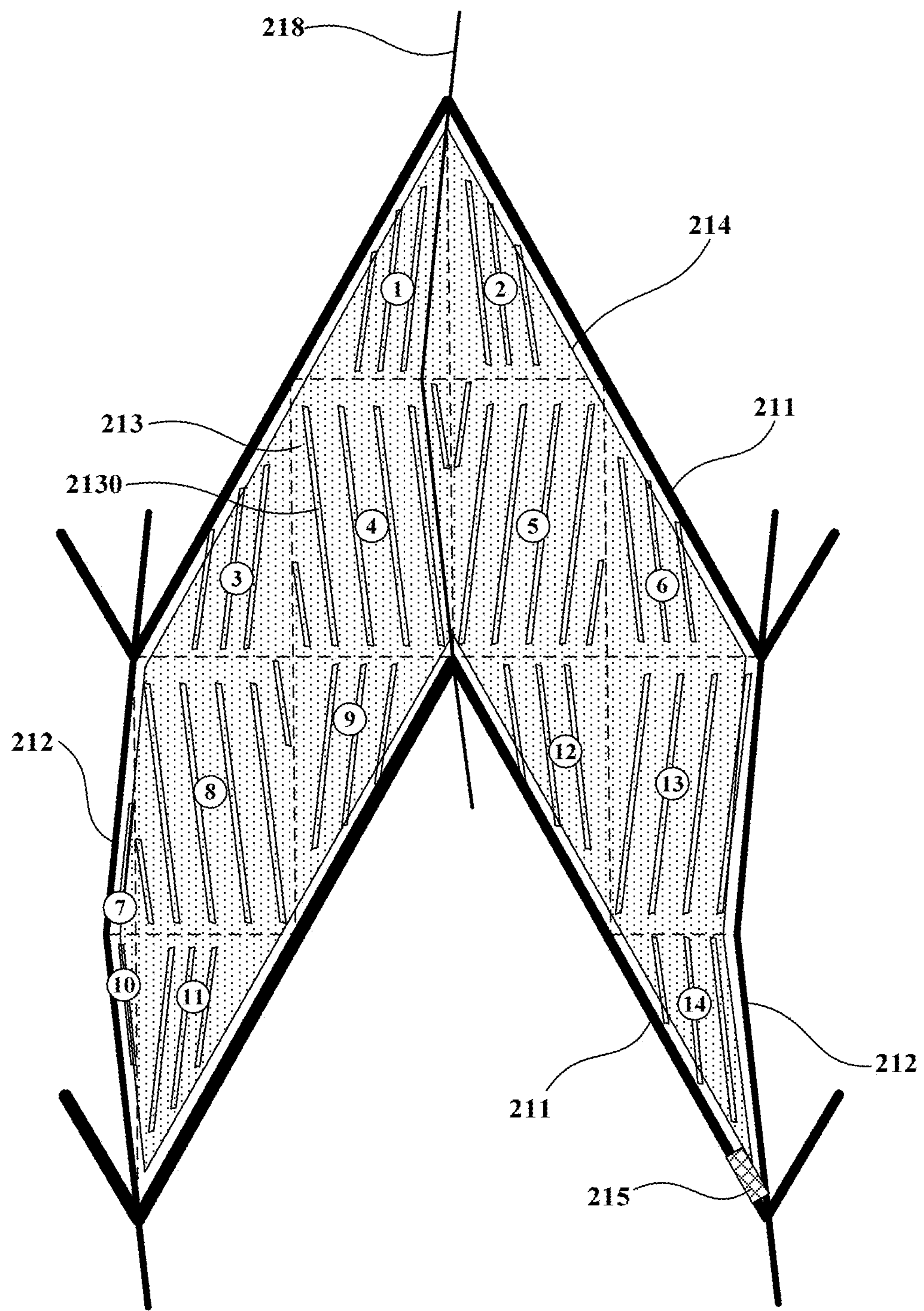
FIG. 3 is a front view of a structure of a dimming region of an array substrate according to an embodiment of the present disclosure.

As shown in FIG. 2*a* and FIG. 3, an embodiment of the present disclosure provides an array substrate 21, comprising:

a first transparent electrode layer 213 with a plurality of slit structures 2130, wherein the first transparent electrode layer 213 comprises a plurality of domains 3, each of the plurality of domains 3 comprises at least two types of domains (e.g., domains 3*a* and 3*b* in the figure, different types of the domains are distinguished by different gray scales), each plurality of domains 3 is adjacent to different types of domains along both a row direction and a column direction, wherein slit structures 2130 located in a same type of domains extend in a same direction, and slit structures 2130 located in different types of domains extend in different directions (in FIG. 3, different domains are schematically demarcated by dashed lines);

a plurality of gate lines 211 extending along a row direction and a plurality of data lines 212 extending along a column direction, the plurality of gate lines 211 and the plurality of data lines 212 crossing to define a plurality of dimming regions 20 arranged in an array, wherein each of the dimming regions is overlapped with the at least two types of the domains in the first transparent electrode layer (i.e. with an area overlapped).

Figure 5:
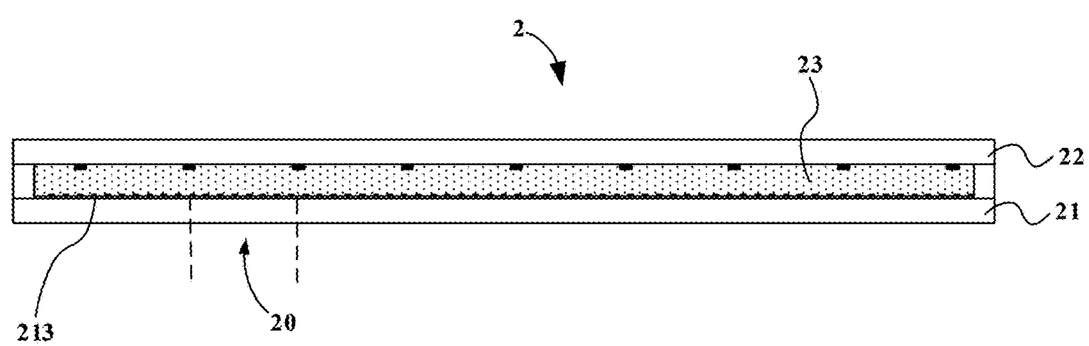
FIG. 5 is a cross-sectional schematic view of a dimming liquid crystal panel according to an embodiment of the present disclosure.

The array substrate 21 in an embodiment of the present disclosure is applied to a dimming liquid crystal panel. Referring to FIG. 5, the dimming liquid crystal panel 2 comprises, in addition to the array substrate 21, an opposite substrate 22 spaced apart from the array substrate 21, and a liquid crystal layer 23 located between the array substrate 21 and the opposite substrate 22. When the dimming liquid crystal panel 2 operates, a backlight is incident into the array substrate 21, passes through the liquid crystal layer 23, and then is emitted out from the opposite substrate 22.

In some embodiments of the present disclosure, the dimming liquid crystal panel is an AD-SDS (Advanced Super Dimension Switch, ADS for short) mode liquid crystal panel. FIG. 3 shows a schematic structure of the array substrate in a dimming region. The array substrate in the embodiment of the present disclosure further comprises a second transparent electrode layer 214 in addition to the first transparent electrode layer 213, the second transparent electrode layer 214 is insulated and spaced apart from the first transparent electrode layer 213, and the second transparent electrode layer 214 is closer to a base (not shown in the figure) of the array substrate than the first transparent electrode layer 213. In some embodiments, the second transparent electrode layer 214 may be a pixel electrode layer including a plurality of planar pixel electrodes, and the first transparent electrode layer 213 with the slit structures 2130 is a common electrode layer. In some other embodiments, the second transparent electrode layer may also be a common electrode layer, and the first transparent electrode layer with the slit structures is a pixel electrode layer including a plurality of pixel electrodes with the slit structures.

As shown in FIG. 2*a* and FIG. 3, the array substrate further comprises a thin film transistor 215 disposed at a crossing of the gate line 211 and the data line 212 and connected to the gate line 211 and the data line 212 respectively. Specifically, a gate electrode of the thin film transistor 215 is connected to the gate line 211, a source electrode of the thin film transistor 215 is connected to the data line 212, and a drain electrode of the thin film transistor 215 is connected to the pixel electrode. In addition, the array substrate further comprises a common electrode line 218 for uniformly transmitting a common voltage signal to the first transparent electrode layer 213 or the second transparent electrode layer 214 serving as the common electrode layer. In this embodiment, the common electrode line 218 is disposed between two adjacent data lines 212.

When the dimming liquid crystal panel operates, an electric field will be generated at an edge of the slit structure 2130 of the first transparent electrode layer 213, and an electric field will be also generated between the first transparent electrode layer 213 and the second transparent electrode layer 214, so as to form a multi-dimensional electric field. The multi-dimensional electric field can deflect most of the liquid crystal molecules, so that the operating efficiency and the transmittance of the dimming liquid crystal panel are improved.

As shown in FIG. 2*a*, in this embodiment, the thin film transistors 215 arranged along the row direction are disposed on a same side of the data lines 212 adjacent to the thin film transistors, the thin film transistors 215 arranged along the column direction are alternately arranged on both sides of each of the data lines 212 adjacent to the thin film transistors, and the data lines 212 alternately transmit data signals to the pixel electrodes on both sides. Compared with a column inversion driving mode (in the column inversion driving mode, all the thin film transistors are arranged on the same side of the adjacent data lines), such a driving design can effectively reduce dithering patterns of the display picture.

In order to achieve symmetry of the viewing angle of the display device, the structure of the dimming region 20 is usually a multi-domain design. As shown in FIG. 2*a* and FIG. 3, each dimming region 20 overlaps with the plurality of domains 3 of the first transparent electrode layer 213 and overlaps with at least two types of domains, and extending directions of the slit structures 2130 of the first transparent electrode layer 213 located in the different types of the domains exhibit a certain symmetry. Thus, under the driving of the electric field, orientations of the liquid crystal molecules corresponding to the different types of domains in the same dimming pixel correspondingly also exhibit a certain symmetry.

In the embodiment of the present disclosure, the density of the domains 3 of the first transparent electrode layer 213 is not limited and may be designed according to a specific size of the display product. In some embodiments, a ratio of the area of one of the plurality of domains to the area of one of the plurality of dimming regions is equal to or greater than 1/16, and equal to or less than 1/2. In the embodiment shown in FIG. 2*a*, the ratio of the area of the domain 3 to the area of the dimming region 20 is about 1/8. The number of the types of the domains 3 included in the first transparent electrode layer 213 is not limited either, for example, two types of domains as shown in FIG. 2*a* may be included, or three or more types of domains may be included. In addition, the shape and size of various domains may be completely the same or different. The shape and size of the same type of domains may be completely the same or different.

In the embodiment shown in FIG. 2*a*, the plurality of domains 3 are rectangular in shape and same in size, the plurality of domains 3 include two types of domains 3*a* and 3*b*, and the two types of domains are arranged in a mosaic shape, so that different types of domains are uniformly disturbed, thereby improving poor stripes of the display picture of the display device macroscopically.

In the embodiment shown in FIG. 2*a*, each dimming region 20 overlaps with fourteen domains 3 (see the domains numbered ① to ⑭ in FIG. 2*a* and FIG. 3*a*) of the first transparent electrode layer 213, and each dimming region 20 overlaps with both the two types of domains of the first transparent electrode layer 213. In the related art shown in FIG. 1*b*, each dimming region 20' overlaps with four domains of the transparent electrode layer 213', and each dimming region 20' overlaps with both the two types of domains 3*a*' and 3*b*' of the transparent electrode layer 213'. As can be seen by comparing FIG. 2*a* with FIG. 1*b*, in the embodiment of the present disclosure, the number of the domains 3 overlapping with the dimming region 20 is larger, which is equivalent to making finer area division on the light emitted from the dimming pixels of the dimming liquid crystal panel in different orientations, thereby achieving an effect of uniform color mixing, and effectively improve poor stripes of the display picture of the display device.

In the embodiments of the present disclosure, a specific shape of each of the plurality of domains 3 is not limited, and may be, for example, a triangle, a rectangle, a diamond, a trapezoid, or a polygon with a number of sides greater than four. The shape of a domain may be polygonal such as a regular polygon, or an irregular polygon such as a substantially L-shaped polygon. The beneficial effect of improving the stripes can be achieved so long as the different types of domains are arranged dispersedly in the row direction and the column direction.

As shown in FIG. 2*a*, in the embodiment of the present disclosure, the domain 3 has a rectangular shape, and the plurality of domains 3 are arranged in a matrix, and the plurality of domains 3 comprise two types of domains, each of the domains 3 being adjacent to a different type of domains. That is, for the domain 3*a* at a non-edge, it is surrounded by four domains 3*b*; likewise, for the domain 3*b* at a non-edge, it is surrounded by four domains 3*a*.

As shown in FIG. 2*a*, in the embodiment of the present disclosure, each of the plurality of gate lines 211 extend in a fold-line waveform along the row direction, and includes a plurality of first fold line units 2110 arranged periodically, wherein each of the plurality of first fold line unit 2110 includes two first straight line segments 03 symmetrically arranged with the column direction as a symmetry axis; each of the plurality of data line 212 extends in a fold-line waveform along the column direction and includes a plurality of second fold line units 2120 arranged periodically, wherein each of the plurality of second fold line units 2120 includes a first subsegment 2120*a* and a second subsegment 2120*b* which are centrosymmetric, and the first subsegment 2120*a* and the second subsegment 2120*b* each include two second straight line segments 04 symmetrically arranged with the row direction as a symmetric axis. By adopting this design, a shape of the dimming pixel of the dimming liquid crystal panel is greatly different from a shape (usually rectangular) of the sub-pixel of the display liquid crystal panel, which is beneficial to the elimination of Moore fringes. In this embodiment, the shapes of the data lines 212 are the same, and a common electrode line 218 is provided between adjacent data lines 212, the common electrode line 218 also extends in a fold-line waveform along the column direction and includes a plurality of third fold line units 2180 arranged periodically, wherein each of the plurality of third fold line units 2180 includes a third subsegment 2180*a* and a fourth subsegment 2180*b* which are centrosymmetric, and the third subsegment 2180*a* and the fourth subsegment 2180*b* each include two third straight line segments 05 symmetrically arranged with the row direction as a symmetric axis.

Figure 2B:
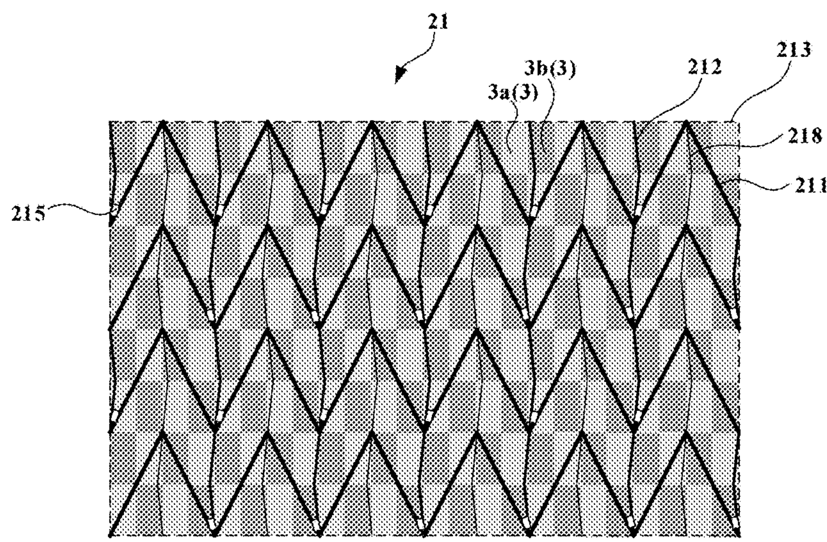
FIG. 2*b* is a front view of an array substrate according to another embodiment of the present disclosure.

As shown in FIG. 2*a*, in some embodiments of the present disclosure, the shapes of the common electrode line 218 and one of the plurality of data lines 212 are substantially symmetrical with respect to the column direction, so that in one dimming region, portions of the common electrode layer on both sides of the common electrode line have a substantially equal area, and therefore, the signal uniformity is better, which can further improve the transverse pattern phenomenon of the picture of the display panel. As shown in FIG. 2*b*, in some other embodiments of the present disclosure, the shapes of the common electrode line 218 and one of the plurality of data lines 212 may be substantially the same.

In addition, in the embodiment, in a direction perpendicular to the array substrate 21, endpoints A1 and A2 of each of the plurality of first fold line unit 2110 coincide with endpoints B1 and B2 or midpoint B3 of one of the plurality of second fold line unit 2120, and a midpoint A3 of each of the plurality of first fold line unit 2110 coincides with endpoints C1 and C2 or midpoint C3 of one of the plurality of third fold line unit 2180. Each of the dimming regions 20 is defined by the first fold line units 2110 in one period of two adjacent gate lines 211 and the second fold line units 2120 in a half period of two adjacent data lines 212.

As shown in FIG. 2*a*, in this embodiment, in the direction perpendicular to the array substrate, first straight line segment 03 substantially coincides with one of diagonal lines of a rectangle comprising two adjacent domains along the row direction and two adjacent domains along the column direction, and orthographic projection of one of the plurality of second fold line units 2120 and one of the plurality of third fold line units 2180 in the column direction is substantially equal to four times a length of a long side of one of the plurality of domains 3.

In the embodiment of the present disclosure, as shown in FIG. 2*a*, the two types of domains 3 have a same area, and the area of one dimming region 20 is substantially equal to the area of eight domains. The two types of domains 3*a*, 3*b* overlapping with one dimming region 20 have the same area which is approximately half the area of the dimming region 20. Each dimming region overlaps with fourteen domains, and a maximum overlapping area with a single domain is equal to the area of the single domain, i.e. approximately one eighth of the area of the dimming region. Compared with the related art, the maximum overlapping area of the dimming region with a single domain is reduced by one fourth, so that a good color mixing effect can be realized, and poor stripes are effectively improved.

As shown in FIG. 2*a* and FIG. 3, in the direction perpendicular to the array substrate, second straight line segments 04 and third straight line segments 05 in the same type of domain extend in the same direction as slit structures 2130 extend. By adopting this design, the arrangement of the slit structures 2130 of the first transparent electrode layer 213 in the dimming region 20 is more optimized, and more fringe electric fields can be generated, which is beneficial to maximization of the transmittance of the dimming liquid crystal panel. In some embodiments, an acute angle formed by one of the plurality of slit structures 2130 and the column direction is in a range greater than or equal to 7° and less than or equal to 11°.

Figure 4:
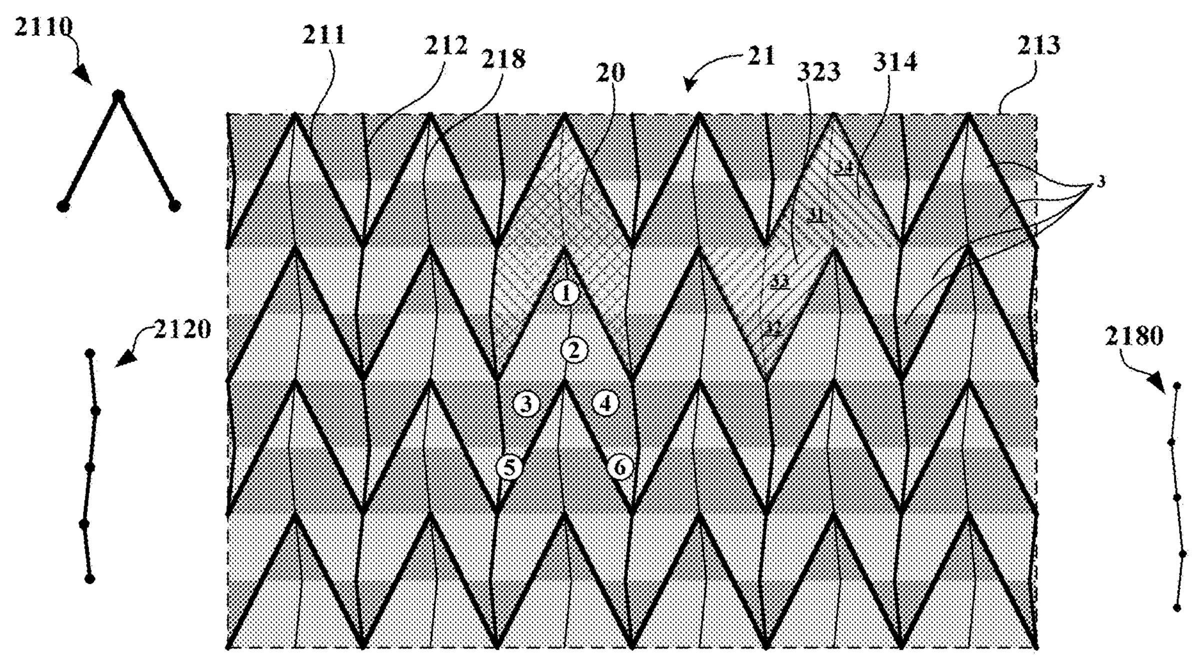
FIG. 4 is a front view of an array substrate according to still another embodiment of the present disclosure.

As shown in FIG. 4, the embodiments of the present disclosure further provide another structure of the array substrate capable of improving poor picture stripes. The difference between the embodiment of FIG. 2*a* and the embodiment of FIG. 4 is the shape design of domains. Specifically, the plurality of domains 3 comprise two types of domains (different types of domains are distinguished by different gray scales), wherein one type of domains comprises a trapezoidal first domain 31 and a triangular second domain 32, and the other type of domains comprises a trapezoidal third domain 33 and a triangular fourth domain 34, wherein: the trapezoidal first domain 31 and the triangular fourth domain 34 are adjacent in the column direction and are spliced into a first isosceles triangle 314, the triangular second domain 32 and the trapezoidal third domain 33 are adjacent in the column direction and are spliced into a second isosceles triangle 323, and in the direction perpendicular to the array substrate 21, two sides of the first isosceles triangle 314 substantially coincide with one of the plurality of first fold line units 2110, and two sides of the second isosceles triangle 323 substantially coincide with one of the plurality of first fold line units 2110.

In some embodiments, as shown in FIG. 4, an area ratio of the trapezoidal first domain 31 to the triangular fourth domain 34 is 3:1, and an area ratio of the trapezoidal third domain 33 to the triangular second domain 32 is 3:1. The first domain 31 and the third domain 33 are same in shape and area, and the second domain 32 and the fourth domain 34 are same in shape and area. An orthographic projection of one of the plurality of second fold line units 2120 and plurality of the plurality of third fold line units 2180 in the column direction is substantially equal to four times a height of the trapezoidal first domain 31.

In the embodiment shown in FIG. 4, each dimming region 20 overlaps with six domains 3 (see the domains numbered ① to ⑥ in the figure) of the first transparent electrode layer 213, and each dimming region 20 overlaps with both the two types of domains of the first transparent electrode layer 213. In the related art shown in FIG. 1*b*, each dimming region 20' overlaps with four domains of the transparent electrode layer 213', and each dimming region 20' overlaps with both two types of domains 3*a*' and 3*b*' of the transparent electrode layer 213'. As can be seen by comparing FIG. 4 with FIG. 1*b*, in the embodiment of the present disclosure, the number of domains 3 overlapping with the dimming region 20 is larger, which is equivalent to making finer area division on the light emitted from the dimming pixels of the dimming liquid crystal panel in different orientations, thereby achieving an effect of uniform color mixing, and effectively improve poor stripes of the display picture of the display device.

Referring to FIG. 5, the embodiments of the present disclosure further provide a dimming liquid crystal panel 2 comprising the array substrate 21 according to any of the foregoing technical solutions, an opposite substrate 22 spaced apart from the array substrate 21, and a liquid crystal layer 23 located between the array substrate 21 and the opposite substrate 22.

Figure 6:
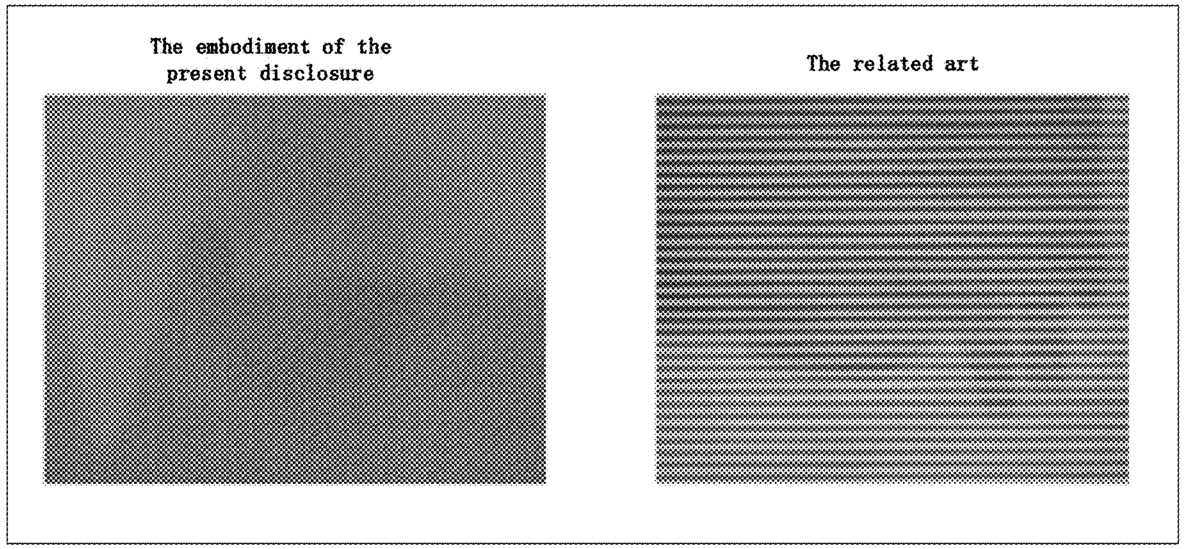
FIG. 6 is partial views of screen simulation of a dimming liquid crystal panel in the related art and a dimming liquid crystal panel according to an embodiment of the present disclosure.

Taking a 75-inch dimming liquid crystal panel as an example, as shown in FIG. 6, the left drawing is a partial view of the screen simulation of the dimming liquid crystal panel according to the embodiment shown in FIG. 2*a* of the present disclosure, and the right drawing is a partial view of the screen simulation of the dimming liquid crystal panel in the related art shown in FIG. 1 *b*. It can be seen that apparent stripes can be seen in the simulated screen of the dimming liquid crystal panel in the related art, while stripes substantially cannot be seen in the simulated screen of the dimming liquid crystal panel according to the embodiment of the present disclosure and the display quality is significantly improved.

Figure 7:
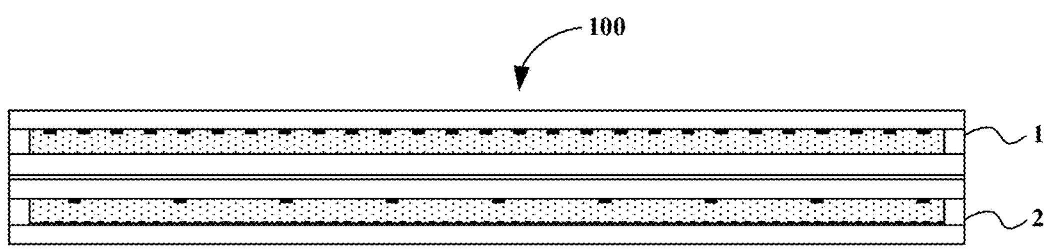
FIG. 7 is a cross-sectional schematic diagram of a display panel according to an embodiment of the disclosure.

As shown in FIG. 7, the embodiments of the present disclosure further provide a display panel 100 comprising the dimming liquid crystal panel 2 according to the foregoing embodiment, and a display liquid crystal panel 1 located on alight emission side of the dimming liquid crystal panel 2.

The display panel is applied to the display device, can realize comparatively fine regional dimming of the picture, has an excellent contrast performance, and can effectively improve poor stripes of the picture compared with the related art, so that the picture quality is relatively high, and then the user experience is remarkably improved. Specific product types of the display device are not limited, and may be, for example, a display, a tablet computer, a notebook computer, a television set, an ATM apparatus, an electronic paper, a display screen, and the like.

So far, the embodiments of this disclosure have been described in detail. In order to avoid obscuring the idea of this disclosure, some details well known in the art are omitted. A person skilled in the art can fully understand how to implement the technical solutions disclosed herein according to the above description.

Although some specific embodiments of the present disclosure have been described in detail with examples, it should be understood by a person skilled in the art that the above examples are only intended to be illustrative but not to limit the scope of the present disclosure. The above embodiments can be modified or partial technical features thereof can be equivalently substituted without departing from the scope and spirit of the present disclosure. The scope of the present disclosure is defined by the attached claims.

What is claimed is:

1. An array substrate comprising:

a first transparent electrode layer with a plurality of slit structures, wherein the first transparent electrode layer comprises a plurality of domains, the plurality of domains comprise at least two types of domains, each of the plurality of domains is adjacent to different types of domains along both a row direction and a column direction, slit structures located in a same type of domain extend in a same direction, and slit structures located in different types of domains extend in different directions; and a plurality of gate lines extending along the row direction and a plurality of data lines extending along the column direction, the plurality of gate lines and the plurality of data lines crossing to define a plurality of dimming regions arranged in an array, wherein each of the plurality of dimming regions is overlapped with the at least two types of domains in the first transparent electrode layer, wherein:

each of the plurality of gate lines extends in a fold-line waveform along the row direction, and comprises a plurality of first fold line units arranged periodically, wherein each of the plurality of first fold line units comprises two first straight line segments symmetrically arranged with the column direction as a symmetry axis;

each of the plurality of data lines extends in a fold-line waveform along the column direction and comprises a plurality of second fold line units arranged periodically, wherein each of the plurality of second fold line units comprises a first subsegment and a second subsegment which are centrosymmetric, and the first subsegment and the second subsegment each comprise two second straight line segments symmetrically arranged with the row direction as a symmetric axis; and the array substrate further comprises: a common electrode line located between adjacent two of the plurality of data lines, wherein the common electrode line extends in a fold-line waveform along the column direction and comprises a plurality of third fold line units arranged periodically, each of the plurality of third fold line units comprises a third subsegment and a fourth subsegment which are centrosymmetric, and the third subsegment and the fourth subsegment each comprise two third straight line segments symmetrically arranged with the row direction as a symmetric axis.

2. The array substrate according to claim 1, wherein a ratio of an area of one of the plurality of domains to an area of one of the plurality of dimming regions is equal to or greater than $1/16$ and equal to or less than $1/2$.

3. The array substrate according to claim 1, wherein shapes of the common electrode line and one of the plurality of data lines are substantially symmetrical with respect to the column direction, or the shapes of the common electrode line and one of the plurality of data lines are substantially the same.

4. The array substrate according to claim 1, wherein in a direction perpendicular to the array substrate, an end point of each of the plurality of first fold line units coincides with an end point or a midpoint of one of the plurality of second fold line units, and a midpoint of each of the plurality of first fold line units coincides with an end point or a midpoint of one of the plurality of third fold line units.

5. The array substrate according to claim 4, wherein in the direction perpendicular to the array substrate, second straight line segments and third straight line segments located in the same type of domain extend in the same direction as slit structures extend.

6. The array substrate according to claim 5, wherein an acute angle formed by one of the plurality of slit structures and the column direction is in a range greater than or equal to 7 degrees, and less than or equal to 11 degrees.

7. The array substrate according to claim 1, wherein the plurality of domains are rectangular in shape and same in size, and the plurality of domains comprises two types of domains arranged in a mosaic shape.

8. The array substrate according to claim 7, wherein:

in a direction perpendicular to the array substrate, each of the first straight line segments substantially coincides with one of diagonal lines of a rectangle comprising two adjacent domains along the row direction and two adjacent domains along the column direction; and an orthographic projection of one of the plurality of second fold line units and one of the plurality of third fold line units in the column direction is substantially equal to four times a length of a long side of one of the plurality of domains.

9. The array substrate according to claim 1, wherein the shape of each of the plurality of domains comprises triangle, rectangle, diamond, trapezoid, or polygon with a number of sides greater than four.

10. The array substrate according to claim 1, wherein the plurality of domains comprise two types of domains, one type of domains comprises a trapezoidal first domain and a triangular second domain, and the other type of domains comprises a trapezoidal third domain and a triangular fourth domain, wherein:

the trapezoidal first domain and the triangular fourth domain are adjacent in the column direction and are spliced into a first isosceles triangle, and in a direction perpendicular to the array substrate, two sides of the first isosceles triangle substantially coincide with one of the plurality of first fold line units; and the triangular second domain and the trapezoidal third domain are adjacent in the column direction and are spliced into a second isosceles triangle, and in the direction perpendicular to the array substrate, two sides of the second isosceles triangle substantially coincide with one of the plurality of first fold line units.

11. The array substrate according to claim 10, wherein:

an area ratio of the trapezoidal first domain to the triangular fourth domain is 3:1, and an area ratio of the trapezoidal third domain to the triangular second domain is 3:1; and an orthographic projection of one of the plurality of second fold line units and one of the plurality of third fold line units in the column direction is substantially equal to four times a height of the trapezoidal first domain.

12. The array substrate according to claim 1, further comprising thin film transistors disposed at crossings of gate lines and data lines and connected to the gate lines and the data lines, wherein:

the thin film transistors arranged along the row direction are arranged on a same side of the data lines adjacent to the thin film transistors; and the thin film transistors arranged along the column direction are alternately arranged on both sides of each of the data lines adjacent to the thin film transistors.

13. The array substrate according to claim 12, further comprising a second transparent electrode layer insulated and spaced apart from the first transparent electrode layer, wherein the second transparent electrode layer is configured to form a fringe electric field with the first transparent electrode layer to control deflection of liquid crystal molecules.

14. A dimming liquid crystal panel comprising: an array substrate according to claim 1, an opposite substrate spaced apart from the array substrate, and a liquid crystal layer located between the array substrate and the opposite substrate.

15. A display panel comprising: the dimming liquid crystal panel according to claim 14, and a display liquid crystal panel located on a light emission side of the dimming liquid crystal panel.

16. The dimming liquid crystal panel according to claim 14, wherein a ratio of an area of one of the plurality of domains to an area of one of the plurality of dimming regions is equal to or greater than 1/16 and equal to or less than 1/2.

17. The dimming liquid crystal panel according to claim 7, wherein shapes of the common electrode line and one of the plurality of data lines are substantially symmetrical with respect to the column direction, or the shapes of the common electrode line and one of the plurality of data lines are substantially the same.

18. The dimming liquid crystal panel according to claim 14, wherein in a direction perpendicular to the array substrate, an end point of each of the plurality of first fold line units coincides with an end point or a midpoint of one of the plurality of second fold line units, and a midpoint of each of the plurality of first fold line units coincides with an end point or a midpoint of one of the plurality of third fold line units.

* * * * *